United States Patent [19]

Azuma et al.

[11] Patent Number: 4,914,464
[45] Date of Patent: Apr. 3, 1990

[54] FOCUSSING APPARATUS FOR CAMERA WITH ZOOM LENS

[75] Inventors: Miyazawa Azuma; Hirotsugu Nakazawa, both of Tokyo, Japan

[73] Assignee: Olympus Optical Co., Ltd., Japan

[21] Appl. No.: 304,801

[22] Filed: Jan. 31, 1989

[30] Foreign Application Priority Data

Feb. 8, 1988 [JP] Japan .................................. 63-026934
Feb. 8, 1988 [JP] Japan .................................. 63-026935

[51] Int. Cl.$^4$ ............................................. G03B 3/00
[52] U.S. Cl. ................................. 354/400; 354/402
[58] Field of Search ............................. 354/400, 402

[56] References Cited

U.S. PATENT DOCUMENTS

| | | | |
|---|---|---|---|
| 4,560,267 | 12/1985 | Nakai ................................. | 354/412 |
| 4,572,645 | 2/1986 | Yoshida et al. ..................... | 354/435 |
| 4,783,676 | 11/1988 | Aihara et al. ...................... | 354/400 |
| 4,825,239 | 4/1989 | Suda et al. .......................... | 354/402 |
| 4,829,331 | 5/1989 | Aihara ................................ | 354/400 |
| 4,831,402 | 5/1989 | Fujita et al. ....................... | 354/400 |
| 4,841,322 | 6/1989 | Kansaki et al. .................... | 354/400 |
| 4,841,325 | 6/1987 | Hoshino et al. ................... | 354/400 |

Primary Examiner—Russell E. Adams
Attorney, Agent, or Firm—Louis Weinstein

[57] ABSTRACT

A focussing apparatus and a focus correcting apparatus both derive information representing a distance from an AF sensor. A CPU stores lens travels at the telephoto end position, and distance information is utilized to retrieve one of the lens travels. A zoom coefficient is found in accordance with a zoom encoder value, and the CPU performs an arithmetic operation to derive a lens travel for a particular focal length which is currently being used. The zoom encoder value is also used to read deviation data $D_k$, which relates to a variation from camera to camera, from $E^2$-PROM, and such data is used to correct the lens travel to determine a final lens travel.

30 Claims, 5 Drawing Sheets

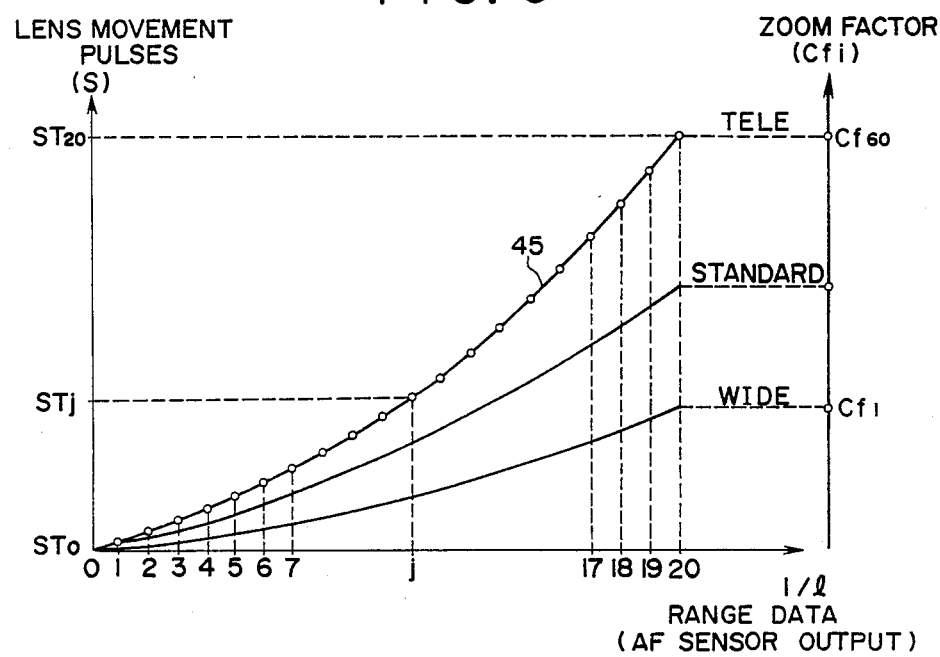
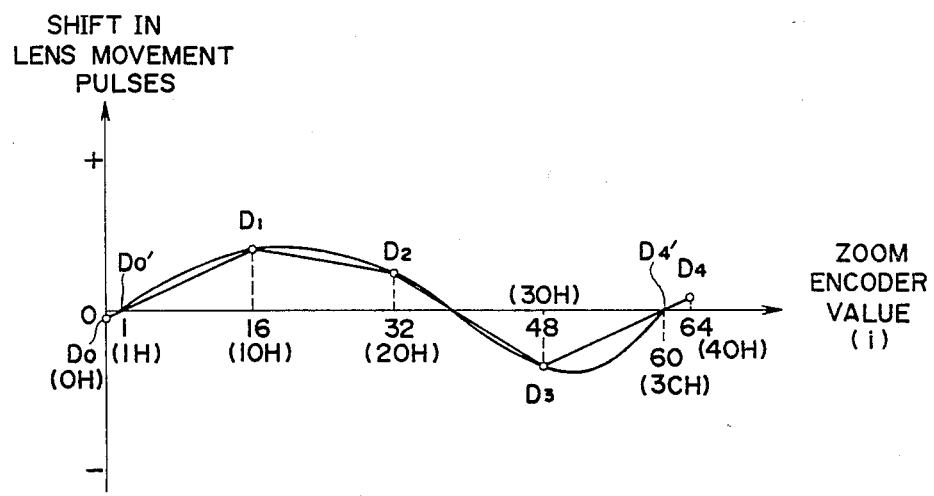

FOCUSSING APPARATUS FOR CAMERA WITH ZOOM LENS

FIELD OF THE INVENTION AND RELATED ART STATEMENT

The invention relates to a focussing apparatus for a camera with zoom lens, and more particularly, to a focussing apparatus which automatically performs a focussing operation of a focussing lens in a zooming mode or a focus correcting apparatus which corrects for any deviation in the in-focus position resulting from variation from lens to lens which may be used in a photographic camera with zoom lens and including non-TTL distance measuring means.

In a camera with a zoom lens in which a focussing operation takes place according to an inner focus scheme, a travel by which a rear lens group is fed forward varies in dependence upon a focal length even though a distance to an object being photographed remains constant, and accordingly, such travel must be varied depending on the zooming operation. To accommodate for this, the present applicant has previously proposed a focussing apparatus in which curves representing a travel by which a lens is to be fed forward are stored as a function of a focal length when the object being photographed is located at infinity ($\infty$) and when it is at nearest point. The distance therebetween is divided into 64 zones so that the lens travel can be calculated in accordance with a particular focal length and a particular distance to an object being photographed (see Japanese Patent Application No. 128,745/1986 or Japanese Patent Application No. 284,317/1987).

The disclosed focussing apparatus is utilized in a video camera, and when it is desired to utilize such apparatus for a silver salt film camera, the number of divided distance zones is insufficient to achieve a focussing operation with a high accuracy. In addition, in the disclosed apparatus, a plurality of curves representing the lens travel are stored for a plurality of values of the focal length, and hence the arrangement requires a microcomputer having a large storage capacity, resulting in an increased cost.

It will be recognized that during the actual assembly of a lens, there occurs a variation from camera to camera, and that a variation also occurs in the size of lens parts. Accordingly, if the calculated lens travel is directly used, there is the possibility that a resulting photographing operation involves a defocussing effect, the degree of which will be greater for a lens having a greater focal length.

OBJECTS AND SUMMARY OF THE INVENTION

It is a first object of the invention to provide a focussing apparatus for camera with zoom lens which accommodates for a an increased number of zones into which the distance data is divided while utilizing a relatively small number of curves.

It is a second object of the invention to provide a focus correcting apparatus for a camera with zoom lens of above character in which a deviation from a reference position is stored for each camera lens so that a correction of a lens travel may be enabled.

With a focussing apparatus for a camera according to the invention, a lens travel may be accurately calculated when the distance is divided into an increased or almost infinite number of zones while utilizing a relatively small amount of storage data and also utilizing a very simple formula for calculation. In particular, there is no need to provide a mechanical cam or the like, thus simplifying the construction and allowing a substantial reduction in the cost required.

A focus correcting apparatus according to the invention allows a variation from camera to camera to be compensated for, and a correction is also possible where there exists a deviation in the optical adjustment.

BRIEF DESCRIPTION OF THE DRAWINGS

FIG. 5 graphically shows a lens travel as a function of an output from an AF sensor; and FIG. 6 graphically shows a correction applied to a lens travel as a function of a zoom encoder position.

DETAILED DESCRIPTION OF PREFERRED EMBODIMENTS

Figure 1A:
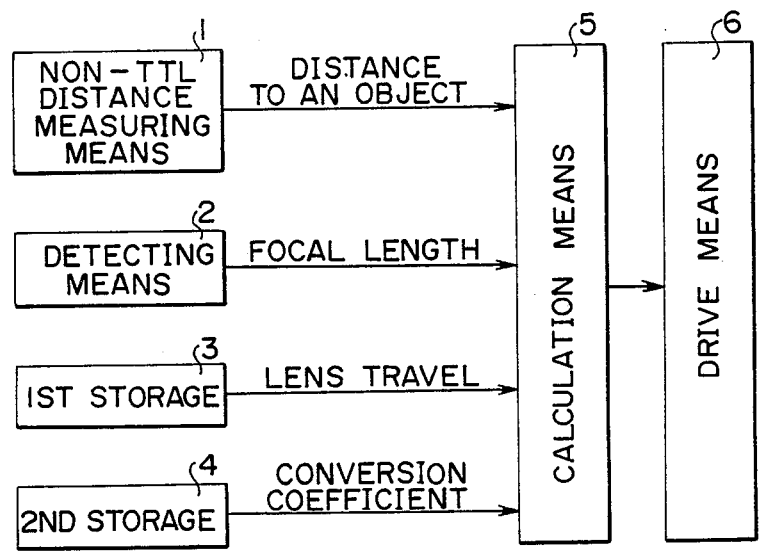
FIG. 1A is a block diagram showing a fundamental construction of a focussing apparatus for a camera with zoom lens according to the invention.

The invention relates to a focussing apparatus for a camera with zoom lens in which travel of a focussing lens from a reference position for a given distance to an object being photographed depends on a particular focal length of the lens. As illustrated in FIG. 1A, travel of a focussing lens for a distance to an object being photographed and for at least one selected reference focal length is stored in first storage means 3. When a distance to an object being photographed is determined by non-TTL distance measuring means 1, calculation means 5 derives a lens travel from the stored values which corresponds to the distance determined. A conversion coefficient is used to convert the lens travel for the particular focal length into a lens travel corresponding to a different focal length. Such conversion coefficient is stored in second storage means 4. When detecting means 2 detects a particular focal length, such value is used to derive the stored conversion coefficient by the calculation means 5. The calculation means 5 then performs an arithmetic operation to determine a lens travel for the particular focal length on the basis of the above mentioned lens travel and the conversion coefficient. The calculated value is used to cause drive means 6 to drive the focussing lens.

Figure 1B:
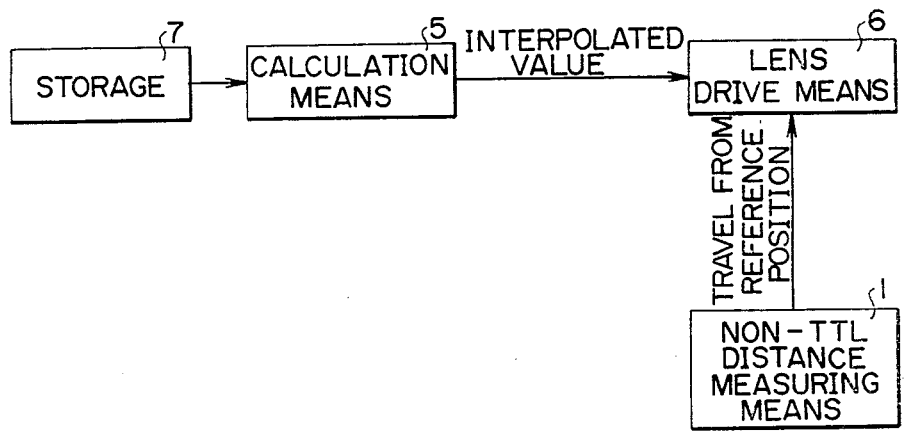
FIG. 1B is a block diagram of a focus correcting apparatus for a camera with zoom lens according to the invention.

The invention also relates to a focus correcting apparatus for a camera with zoom lens. As illustrated in FIG. 1B, non-TTL distance measuring means 1 derives information representing a distance to an object being photographed. This, combined with information representing a particular focal length, is used to calculate a travel of a focussing lens from a reference position. It will be recognized that a deviation in the calculated travel may occur due to such factors as a lens assembly or variation of size from lens part to part, and such deviation is stored in storage means 7 in a manner corresponding to each focal length. A plurality of such stored values may be inputted to calculation means 5 which then performs an interpolation therebetween. The calculated travel from the reference position, to which the result of the interpolation is added is used, as a final travel, to cause lens drive means 6 to drive the focussing lens.

Figure 2:
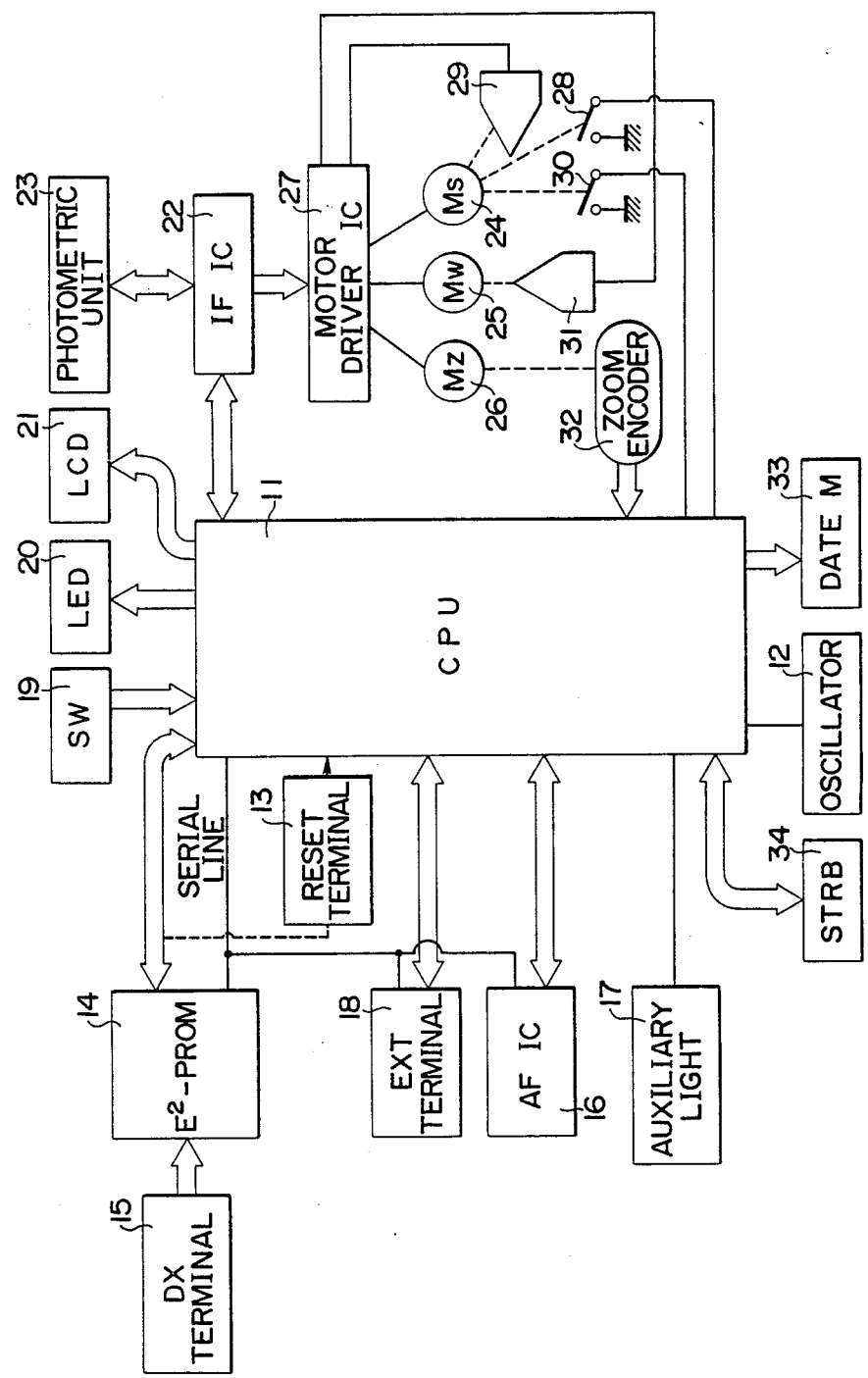
FIG. 2 is a block diagram of a basic system of a camera with zoom lens in which the invention is incorporated.

Referring to FIG. 2, a basic system of a camera with zoom lens in which the invention is incorporated will be described. Specifically, CPU (central processing unit) 11 comprises a single chip microcomputer which exercises control over the entire camera. An oscillator 12 feeds a fundamental clock to CPU, the operation of which is started by a reset signal from a reset circuit 13. The reset circuit 13 is activated when a storage battery is loaded and when a power switch, not shown, is turned on or off.

$E^2$-PROM 14 represents a non-volatile memory which keeps track of a camera status (a number of frames, or the execution of winding operation or the like) and which also stores adjustment data (shutter control, lens drive). Accordingly, when the battery is withdrawn, the camera may be returned to its previous status. As will be described later, $E^2$-PROM 14 also stores a deviation of lens travel which is caused by variation from lens to lens. A reset operation by the reset circuit 13 is inhibited during the time data is being written into $E^2$-PROM 14. During a read mode of $E^2$-PROM 14, the DX code of a film being used is fed from DX terminal 15 to $E^2$-PROM 14, which then supplies it to CPU 11 through a serial line. Subsequently, data from $E^2$-PROM 14 is fed to CPU 11.

AFIC 16 represents an AF (auto-focus) sensor of phase difference type located for non-TTL distance measurement, and distance data therefrom is fed to CPU 11. When a photometric value is equal to or less than a given value (when it is dark), CPU 11 operates to energize an auxiliary lamp 17 in conjunction with the operation of AFIC 16. EXT terminal 18 is provided for connection with an external equipment such as an option or automatic adjusting unit. $E^2$-PROM 14, AFIC 16 and EXT terminal 18 are connected to a common serial line for effective use of ports of CPU 11, and thus data communication with CPU 11 takes place in a serial manner.

SW 19 represents an operation switch assembly mounted on the camera including a release switch, a mode changeover switch or the like. LED 20 represents a light emitting diode assembly dispose within a viewfinder including light emitting diodes which may be used to annunciate an emission from an electronic flash or for indicating an in-focus condition. LCD 21 represents a liquid crystal display panel which may be used to display a number of frames or a camera mode. IFIC 22 represents an interface integrated circuit having the functions of conducting a photometry by means of a photometric unit 23 and decoding an instruction from CPU 11 to select a particular motor within the camera.

$M_S$ 24, $M_W$ 25 and $M_Z$ 26 represents a shutter motor, a wind up/rewind motor and a zoom motor, respectively, and are driven by a decoded signal from IFIC 22 through a motor driver IC 27. $M_S$ 24 performs a lens drive during its rotation in the forward direction and performs a shutter drive during its rotation in the reverse direction. During the lens drive, a reset position of a lens is recognized by a closed (ON) condition of a switch 28 while a controlled position thereof is recognized in terms of a number of pulses from a photo-interrupter 29. During the shutter drive, a reset position is recognized by an ON condition of a switch 30 and an aperture control is made by adjusting the width of pulse for $M_S$ 24. Such adjusted value is stored in $E^2$-PROM 14. $M_W$ 25 winds up a film during its rotation in the forward direction and rewinds a film during its rotation in the reverse direction. A frame feed of the film is controlled by counting a number of pulses by a photo-interrupter 31. The photo-interrupters 29, 31 are activated only when $M_S$ 24 and $M_W$ 25, respectively, are selected, and a photo-interrupter output is fed to CPU 11 through IFIC 22. A zoom position of $M_Z$ 26 can be detected by a zoom encoder 32.

DATEM 33 represents a date module which is used to enter such data as a date or time of day onto a film, and STRB 34 represents an electronic flash.

Figure 3:
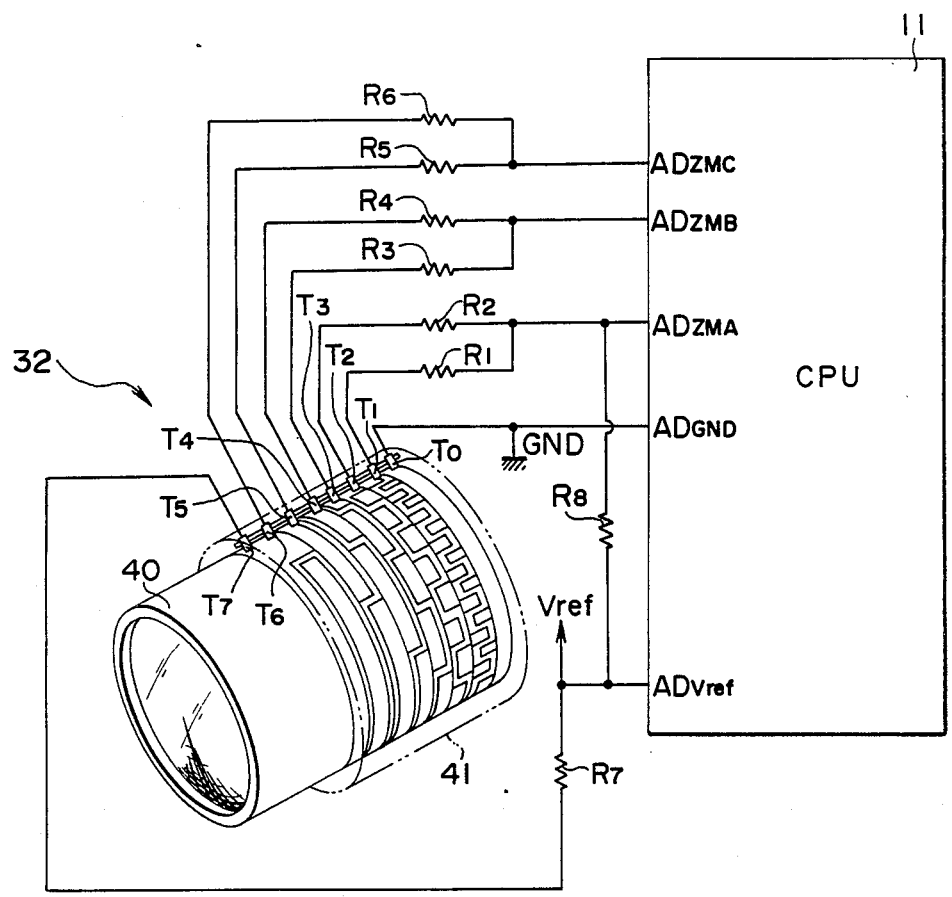
FIG. 3 is a circuit diagram of a zoom encoder shown in FIG. 2 together with a perspective view of part of the camera.

Referring to FIG. 3, the zoom encoder 32 will be considered. As shown, the zoom encoder 32 comprises a conductive pattern in the form of a thin film integrally applied around an external peripheral surface of a zoom ring 40, conductive contacts disposed for sliding contact with the conductive pattern, and an associated resistor bank. When $M_Z$ 26 (see FIG. 2) rotates, the zoom ring 40 is rotated, whereby a cam, not shown, disposed within the zoom ring causes a zoom lens to translate back and forth along its longitudinal axis, thus changing a focal length. A focal length can be determined by detecting a position which the zoom encoder 32 assumes on the zoom ring 40.

Eight contacts $T_0$ to $T_7$, which are used to detect the position of the zoom encoder 32, are mounted on a stationary frame 41, and are connected to a ground terminal $AD_{GND}$ of CPU 11 as well as each one end of resistors $R_1$, $R_2$, $R_3$, $R_4$, $R_5$, $R_6$ and $R_7$. It is to be noted that the values of these resistors are chosen such that $R_1/R_2 = R_3/R_4 = R_5/R_6 = 1.67$. The other ends of the resistors $R_1$ and $R_2$ are connected together and connected to an A/D conversion terminal $AD_{ZMA}$ of CPU 11. The other ends of the resistors $R_3$ and $R_4$ are also connected together and connected to an A/D conversion terminal $AD_{ZMB}$ of CPU 11. Similarly, the other ends of the resistors $R_5$ and $R_6$ are connected to an A/D conversion terminal $AD_{ZMC}$. The other end of the resistor $R_7$ is connected to a terminal $AD_{Vref}$, to which a reference voltage Vref to CPU 11 is applied. The resistor $R_7$ provides a safeguard against the possibility that the reference voltage Vref be short-circuited to the ground terminal GND.

Figure 4A:
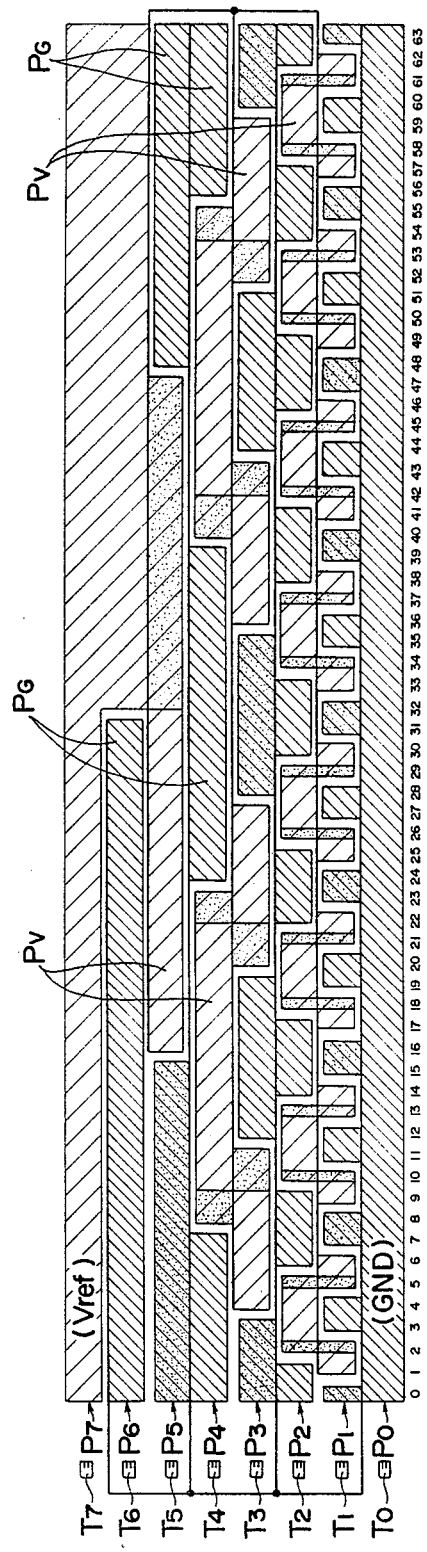
FIGS. 4A and 4B respectively show a development of an encoder pattern formed on a zoom ring shown in FIG. 3 and a chart of codes for different encoder positions.

FIG. 4A shows a development of the conductive pattern applied to the zoom encoder 32. Contacts $T_0$ and $T_7$, which are located at the opposite ends of the contact assembly $T_0$ to $T_7$, are disposed for sliding contact with conductive patterns $P_0$ and $P_7$, respectively, which are formed by a conductive member extending continuously throughout the entire zoom range along the circumference of the zoom ring 40. It will be noted that a ground potential GND and a reference voltage Vref are applied to these patterns. Contacts $T_1$ to $T_6$ which are located between the contacts $T_0$ to $T_7$ are disposed for sliding contact with individual rows of patterns $P_1$ to $P_6$, respectively, each of which is formed by a conductor which is interrupted along the circumference of the zoom ring 40 as shown. It will be noted that each row of patterns $P_1$ to $P_6$ electrically comprises an electrode pattern portion $P_G$ (shown by closely spaced hatching lines) which is connected to the conductive pattern $P_0$ and hence applied with the ground potential GND, an electrode pattern portion $P_V$ (shown in widely spaced hatching lines) which is connected to the conductive pattern $P_7$, and hence applied with the reference voltage Vref, and the remainder where no electrode is present. Accordingly, as the zoom ring 40 is turned, the contacts $T_1$ to $T_6$ slide over the respective patterns $P_1$ to $P_6$ of the zoom encoder 32 whereby the contacts $T_1$ to $T_6$ derive a coded signal representing an angular position of the zoom ring 40, as 64 combinations starting from a start point 0 and continuing to an end point 63 of the zoom encoder, in accordance with the configurations of the patterns $P_1$ to $P_6$. It is to be noted in FIG. 4A that regions in the electrode patterns $P_G$ and $P_V$ which are stippled represent auxiliary patterns, the purpose of which is to prevent a malfunctioning, and hence which can be considered as regions where no electrode is present.

Figure 4B:
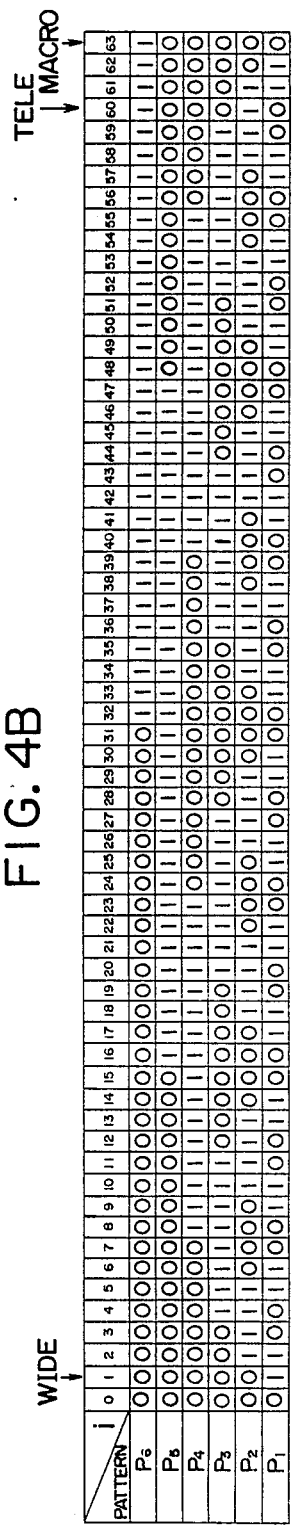

Coded signals representing 64 combinations of the patterns $P_1$ to $P_6$ which are read by the contacts $T_1$ to $T_6$ are shown in FIG. 4B. In this chart, the contacts $T_1$ to $T_6$ assume "1" when the reference voltage Vref is applied thereto, and assume "0" when the ground potential GND is applied thereto.

Considering only the patterns $P_1$ and $P_2$, it will be noted that when such patterns are read by the contacts $T_1$ and $T_2$, four states or combinations (0, 0), (0, 1), (1, 1) and (1, 0) can be determined. Accordingly, by choosing suitable values for the resistors $R_1$ and $R_2$, four levels can be determined at the A/D conversion terminal $AD_{ZMA}$ of CPU 11 as indicated in the table below.

TABLE

| $P_2$ | $P_1$ | ideal A/D value (Vref = 1) | tolerance of variation (A/D error 0.02) |
|---|---|---|---|
| either one H (the other may be OFF) | | 1 | 0.77~1 |
| H | L | $R_1/(R_1 + R_2) = 0.625$ | 0.52 ~ 0.72 |
| L | H | $R_2/(R_1 + R_2) = 0.375$ | 0.27 ~ 0.47 |
| either one L (one may be OFF) | | 0 | 0 ~ 0.22 |

Specifically, an input to the A/D conversion terminal $AD_{ZMA}$ which is determined by the composite resistance of the resistors $R_1$ and $R_2$ can be divided into four levels from 0 to 0.22, from 0.27 to 0.47, from 0.52 to 0.72, and from 0.77 to 1 as indicated in the above table, when the reference voltage Vref assumes a value of 1 since $R_1:R_2=1.67$. The A/D conversion terminal $AD_{ZMA}$ of CPU 11 has a high impedance, so that when one of the patterns $P_1$ and $P_2$ is off, it assumes the level of the other pattern. The same is true with respect to the remaining two A/D conversion terminals $AD_{ZMB}$ and $AD_{ZMC}$ of CPU 11.

Because the zoom encoder 32 includes 6 rows of patterns, it is possible to detect a total of 64 (from 0 to 63) encoder positions. Encoder position "1" represents a wide angle end position. An encoder position "60" represents a telephoto end position, and an encoder position "63" represents a macro position. Encoder positions "61" and "62" represent positions where no photographing operation is enabled, and an encoder position "0" represents an out of wide angle position.

When an input to each of the A/D conversion terminals $AD_{ZMA}$, $AD_{ZMB}$ and $AD_{ZMC}$ is divided into four levels, a subsequent processing can be greatly simplified. It will be noted that a result of A/D conversion will be 6 bits in total, of which the most significant two bits correspond to "00", "01", "10" and "11" (in binary notation), which represents four levels, thus avoiding the need to subdivide it into different levels. Because an increased range of tolerance is provided, a stable result is obtained in the presence of variations in the resistances or the value of the reference voltage Vref.

Returning to FIG. 3, the ends of the resistors $R_1$ and $R_2$ which are connected together to the terminal $AD_{ZMA}$ may be connected through a resistor $R_8$ having a high resistance to the reference voltage Vref, whereby the occurrence of "11" (in binary notation) can be determined if contacts $T_1$ and $T_2$ contact no electrode portion (OFF). This arrangement serves to prevent a malfunctioning where patterns $P_1$ and $P_2$ are closely spaced, and also serves to simplify the arrangement of the electrode patterns.

The calculation of a lens travel which is used during an automatic focussing operation will now be considered. Distance data L corresponding to a distance l to an object being photographed is fed to CPU 11 in a form including 6 bits for an integer and 6 bits for a decimal fraction. Since the camera here contemplated is of an inner focus type, a lens travel or a number of lens feed pulses S varies in accordance with a zoom position (focal length) even when an equal distance is being dealt with, as graphically shown in FIG. 5. Specifically, FIG. 5 graphically depicts typical curves corresponding to the telephoto end, a standard and a wide angle end. It is to be understood however that there are 60 different lens travel curves from the wide angle end position "1" to the telephoto end position "60", according to which a lens feed operation takes place. However, because a memory in CPU 11 is insufficient to store all of these curves, it is to be noted that for the telephoto end curve 45 alone, a lens feed or travel S for twenty values of distance data L which assume an integral number from 0 to 20 is stored in ROM. The lens travel S for the telephoto end is denoted by $ST_j$ (j=0 to 20). It will be noted that a curve for a particular focal length other than the telephoto end will be located, for any distance data L, at a point which represents an internal division with respect to the telephoto end curve 45. Accordingly, an approximation for a curve of a particular focal length other than the telephoto end can be obtained by multiplying the telephoto end curve 45 by a certain zoom coefficient. For this reason, ROM within CPU 11 stores zoom coefficients $Cf_i$ (i=1 to 60) corresponding to 60 curves. In other words, a zoom coefficient $Cf_i$ corresponding to a particular encoder value i is stored in ROM of CPU 11.

Consequently, if the zoom ring 40 is operated to reach a zoom encoder value i, a zoom coefficient $Cf_i$ which corresponds to the encoder value i is read from ROM. On the other hand, a lens travel for the telephoto end position which corresponds to a distance to an object being photographed which is determined by AFIC 16 is read from ROM. A calculation is then made within CPU 11 by applying the zoom coefficient $Cf_i$ to the lens travel for the telephoto end position, thus deriving a lens travel for a particular zoom encoder value i.

Assuming that data from AFIC 22 includes an integer portion a and a fractional portion b, a lens travel (or a number of feed pulses) S for a particular zoom encoder value i is determined according to the following simple formula:

$$S = \{b(ST_{a+1} - ST_a) + ST_a\} \cdot Cf_i \quad (1)$$

It will be appreciated that a 4 bit microcomputer including a reduced number of instructions which are usable in an arithmetic operation is fully capable of performing a calculation according to such formula. It should be understood that a macro curve is quite different from those illustrated in FIG. 5, and accordingly, a macro curve is specially stored in CPU 11. The formula used for calculation remains the same as mentioned above except that the zoom coefficient $Cf_i$ is removed from the equation (1).

The above description premises that a zoom lens has been manufactured exactly in accordance with a design. In actuality, there is variation from lens to lens because of a manufacturing process, with the consequence that curves shown in FIG. 5 will shift or translate up or down. It is obvious that such translation depends on a particular lens involved. What must be borne in mind is the fact that if a deviation is reduced to 0 at the telephoto end position or the wide angle end position, the deviation cannot be reduced to 0 at a zoom position intermediate therebetween, as illustrated in FIG. 6 by way of an example. It will be seen from FIG. 6 the adjustment has reduced the deviation to zero at the wide angle position "1" and the telephoto end position "60".

Accordingly, in the camera according to the invention, the deviation data is stored in $E^2$-PROM 14 in the form of five data $D_k$ ($k = 0$ to 4). Stored data correspond to zoom encoder values 0 (or O H in the hexadecimal notation), 16 (10 H), 32 (20 H), 48 (30 H) and 64 (40 H) where at least the four least significant bits of the converted digital value is equal to "0000". These data are stored as $D_0$, $D_1$, $D_2$, $D_3$ and $D_4$. It will be noted that points for the zoom encoder positions "0" and "64" cannot be determined. Accordingly, a deviation in the number of pulses at respective points 1 (1 H), 16 (10 H), 32 (20 H), 48 (30 H) and 60 (3 CH) are determined. Using determined data $D'_0$ and determined data $D'_4$ corresponding to the zoom encoder position of the wide angle end position of "1" and the telephoto end position "60", respectively, data $D_0$ and $D_4$ for the zoom encoder positions "0" and "64" are determined in the manner given below.

$$D_0 = D'_0 - (D_1 - D'_0)/15 \quad (2)$$

$$D_4 = D_3 + (D'_4 - D_3)/12 \quad (3)$$

On the basis of five deviation data for selected zoom encoder position i mentioned above, a number of pulses which compensate for the deviation at a non-selected zoom encoder position i is calculated by an interpolation. A travel Zs or a number of feed pulses for a zoom encoder position i is determined by the equation given below.

$$Zs = D_{ia} + (D_{(ia+1)} - D_{ia}) \cdot ib \quad (4)$$

where ia represents an integer represented by the two most significant bits of a binary notation of the zoom encoder position i, and ib represents a decimal fraction represented by the four least significant bits. The travel Zs given by the equation (4) is fully within the capability of a 4-bit microcomputer.

From the foregoing description, it will be seen that the actual travel is equal to (S+Zs). It will be noted from the equations (2) and (3) that even when a deviation occurs (not equal to 0) at the telephoto end position or the wide angle end position, the described correction can be made by storing it in $E^2$-PROM 14.

As mentioned, in the present embodiment, information representing a distance is initially supplied from AFIC 16, and is used to search for data representing a lens travel for the telephoto end position in CPU 11. Subsequently, the zoom encoder value i is used to derive a zoom coefficient $Cf_i$, which is used in an arithmetic operation within CPU 11 to determine a lens travel for a particular focal length being used. In addition, data $D_k$ representing a variation from camera to camera is read from $E^2$-PROM 14 utilizing the zoom encoder value i, and is used to correct the lens travel once determined, thus eventually deriving an actual lens feed to be used.

What is claimed is:

1. A focussing apparatus for a camera with zoom lens in which travel of a focussing lens from a reference position varies with a particular focal length being used when an object being photographed is located at a given distance from the camera; the apparatus comprising:

non-TTL distance measuring means for determining a distance to an object being photographed;

detecting means for detecting a particular focal length;

first storage means for storing a travel of a focussing lens at at least one reference focal length which corresponds to the distance to the object;

second storage means for storing conversion coefficients which are used to convert a lens travel for the reference focal length to a corresponding lens travel for a selected focal length;

calculation means responsive to a particular focal length detected to derive a conversion coefficient from the second storage means and responsive to a distance to an object being photographed detected to derive a lens travel from the first storage means, the calculation means performing an arithmetic operation using the lens travel and the conversion coefficient;

and drive means responsive to a calculated output from the calculation means to drive the focussing lens.

2. A focussing apparatus according to claim 1 in which said non-TTL distance measuring means comprises an AFIC or an AF sensor of phase difference type which is disposed within a distance measuring unit located adjacent to a taking lens.

3. A focussing apparatus according to claim 1 in which the detecting means comprises a zoom encoder.

4. A focussing apparatus according to claim 3 in which the zoom encoder comprises conductive patterns in the form of thin films applied around an external peripheral surface of a zoom ring which is utilized to translate the zoom lens in order to change focal length, conductive contacts fixedly mounted on a stationary frame for sliding contact with the conductive patterns, and a bank of resistors connected to the individual conductive contacts for delivering an encoder output to an A/D converter, whereby a particular focal length is determined by detecting the position of the zoom encoder.

5. A focussing apparatus according to claim 4 in which the zoom ring is driven for rotation by a zoom motor.

6. A focussing apparatus according to claim 4 in which the zoom encoder delivers a plurality of encoded signals including a wide angle end position "1" to a telephoto end position "60", as the zoom ring is turned.

7. A focussing apparatus according to claim 1 in which the first storage means comprises a read only memory within a central processing unit.

8. A focussing apparatus according to claim 1 in which the second storage means comprises a read only memory within a central processing unit.

9. A focussing apparatus according to claim 1 in which the calculation means comprises a central processing unit which calculates a lens travel S (a number of lens feed pulses) according to the following formula:

$$S = \{b(ST_{a+1} - ST_a) + ST_a\} \cdot C_{fi}$$

where
- $ST_j$: a lens travel for distance data j from non-TTL distance measuring means;
- $C_{fi}$: a conversion coefficient at a zoom encoder value i;
- i: a zoom encoder value;
- a: an integer of distance data j;
- b: a decimal fraction of distance data j and wherein the lens travel is stored for integer values of i.

10. A focus correcting apparatus for a camera with zoom lens in which a travel of a focussing lens from a reference position is calculated on the basis of information representing a distance to an object being photographed and which is obtained by non-TTL distance measuring means and information representing a particular focal length; the apparatus comprising:
storage means for storing a deviation in the calculated travel which is caused by factors during assembly of said lens or variation in the size from lens part to part, the deviation being stored in a manner corresponding to each focal length;
calculation means for performing an interpolation between a plurality of stored values of the deviation;
and lens drive means for driving the focussing lens on the basis of a final travel which is equal to the sum of the calculated travel and a result of the interpolation.

11. A focus correcting apparatus according to claim 10 in which the storage means comprises an $E^2$-PROM.

12. A focus correcting apparatus according to claim 11 in which said $E^2$-PROM stores a plurality of data $D_k$ representing the deviation in a plurality of groups extending from the wide angle position to the telephoto end position.

13. A focus correcting apparatus according to claim 10 in which the calculation means comprises a central processing unit, for calculating the deviation in terms of a number of pulses at a given zoom encoder position by an interpolation on the basis of stored deviation data at a plurality of zoom encoder positions, according to the following formula:

$$Zs = D_{ia} + (D_{(ia+1)} - D_{ia}) \cdot ib$$

where
- $D_{ij}$: a deviation from a stored reference number of pulses for a zoom encoder value ij;
- ia: an integer portion of the zoom encoder value j;
- ib: a decimal fraction of the zoom encoder value j and wherein the deviation values are stored only for integer values of i.

14. A camera with a zoom lens; comprising:
variable focal length presetting means for changing a focal length of a taking lens;
focal length detecting means for detecting a focal length which is preset by the presetting means;
distance measuring means for determining a distance to an object being photographed in a non-TTL manner;
first storage means for storing lens travels corresponding to a plurality of distances at a reference focal length;
first calculation means for calculating a lens travel corresponding to a distance determined by the distance measuring means on the basis of stored values in the first storage means;
second storage means for storing conversion coefficients which are used to convert a lens travel at the reference focal length to a corresponding lens travel at a particular focal length, the conversion coefficients being associated with each individual focal length;
second calculation means for calculating a final lens travel at a particular focal length on the basis of a lens travel calculated by the first calculation means and a conversion coefficient which corresponds to a particular focal length detected by the focal length detecting means;
and drive means for driving the lens in accordance with the final lens travel calculated by the second calculation means.

15. A camera according to claim 14 in which the first calculation means calculates a lens travel according to the following formula:

$$S1 = \{b(ST_{a+1} - ST_a) + ST_a\}$$

and the second calculation means calculates a final lens travel according to the following formula:

$$S2 = S1 \cdot Cf_i$$

where
- $ST_j$: a lens travel corresponding to distance data j from the non-TTL distance measuring means;
- $Cf_i$: a conversion coefficient at a zoom encoder position i;
- i: a zoom encoder value
- a: an integer portion of distance data from the non-TTL distance measuring means;
- b: a decimal fraction of the distance data j.

16. A camera with a taking lens comprising:
non-TTL distance measuring means for determining a distance to an object being photographed;
storage means for storing a plurality of travels of a taking lens in a manner corresponding to a plurality of predetermined distances to an object being photographed;
calculation means responsive to information representing a distance to an object being photographed which is supplied from the non-TTL distance measuring means to select two of the stored lens travels in the storage means and operative to perform an interpolation between the selected two lens travels to derive a lens travel value;

means for generating a signal which is related to a movement of the taking lens; and drive control means for controlling drive means associated with the taking lens in accordance with the travel of the taking lens which is derived by the calculation means and the signal.

17. A method of adjusting the focus of the taking lens of a camera including a variable focal length presetting means; comprising the steps of:

determining the distance to an object being photographed in a non-TTL manner;

detecting a focal length established by the presetting means which changes the focal length of the taking lens;

selecting lens travels corresponding to a plurality of typical distances at a reference length which lens travels are stored in a first storage means;

performing a first calculation by an interpolation on the basis of stored values selected from said first storage means to determine a travel which corresponds to the distance determined by the distance measuring means;

selecting one of a plurality of conversion coefficients, which corresponds to the particular focal length, which coefficients are stored in a second storage means, the conversion coefficient being used to convert a lens travel at the reference focal length to a corresponding lens travel at a particular focal length;

performing a second calculation which applies a conversion coefficient corresponding to the particular focal length detected to the lens travel calculated by the first calculation to derive a final lens travel at the particular focal length; and driving the lens according to the final lens travel calculated by the second calculation.

18. A method of adjusting the focus of the taking lens of a camera, comprising the steps of:

determining a distance to an object being photographed in a non-TTL manner;

using the determined distance to select stored values from a storage means which stores lens travels corresponding to a plurality of distances to an object being photographed;

determining a lens travel corresponding to the distance by an interpolation between a pair of lens travels which are stored in the storage means;

generating a signal which is related to a movement of the lens; and controlling drive means associated with the taking lens in accordance with the signal and the lens travel obtained by the calculation.

19. A camera with a zoom lens, comprising:

variable focal length presetting means which changes a focal length of the taking lens;

focal length detecting means for detecting a focal length which is established by the presetting means;

distance measuring means for determining a distance to an object being photographed in a non-TTL manner and delivering information representing such distance;

first storage means for storing lens travels corresponding to several distances at a reference focal length;

second storage means for storing conversion coefficients which are used to convert a lens travel at the reference focal length to a corresponding lens travel at a particular focal length, the conversion coefficients being separately associated with different focal lengths;

third storage means for storing a deviation in the lens travel at the individual focal lengths which is caused by the camera manufacturing process;

calculation means for calculating a final lens travel at a particular focal length on the basis of a lens travel which is derived from the first storage means on the basis of the distance information, a conversion coefficient at a particular focal length which is detected by the focal length detecting means and a deviation stored in the third storage means;

and drive means for driving a lens in accordance with a final lens travel determined by the calculation means.

20. A camera according to claim 19 in which the first storage means stores lens travels corresponding to a plurality of typical distances to an object being photographed, a lens travel corresponding to an intermediate distance between stored distances being determined by an interpolation.

21. A camera according to claim 19 in which the third storage means comprises an electrically writable, non-volatile memory.

22. A camera according to claim 19 in which the third storage means stores values of the deviation for a plurality of focal lengths, a deviation for intermediate focal length being determined by an interpolation.

23. A camera with a zoom lens, comprising:

focal length detecting means for detecting a focal length which is established;

calculation means for calculating a lens travel corresponding to a distance to an object being photographed, at a particular focal length which is detected by the focal length detecting means;

storage means for storing corrections which compensate for individual deviations caused by the camera manufacturing process;

correcting means for correcting a lens travel determined by the calculation means using a selected correction;

and drive means for driving a lens in accordance with the corrected lens travel.

24. A camera according to claim 23 in which values of the correction for a plurality of focal lengths are stored in said storage means, and any intermediate value of the correction is determined by an interpolation.

25. A camera according to claim 24 in which the storage means comprises an electrically writable, non-volatile memory.

26. Focussing apparatus for a camera having a zoom lens comprising:

non-TTL distance measuring means for measuring the distance between the camera and an object being photographed;

means for adjusting the focal length of the lens;

means for detecting the focal length adjustment;

means for storing a value representing the travel of the lens to obtain a focussed condition corresponding to the object distance obtained from said measuring means;

means for storing conversion coefficients for converting a lens travel for a reference focal length to a corresponding lens travel for a selected focal length;

calculation means responsive to the detected focal length for obtaining a conversion coefficient from said storage means and means responsive to the distance determined by said measuring means for selecting a lens travel value from said storage means; and said calculation means including means for calculating the desired lens travel based on the selected conversion coefficient and selected travel values stored in said storage means.

27. The focussing apparatus of claim 26 wherein said focal length detecting means comprises encoder means for generating a code representative of the focal length to which said lens is adjusted.

28. The focussing apparatus of claim 27 wherein said encoder means further comprises first means for generating a digital code comprised of a predetermined number of code elements and second encoder means for converting said predetermined code into a second predetermined code comprised of a number of code elements equal to one-half the code elements of said first-mentioned code.

29. The focussing apparatus of claim 28 wherein said code elements of said second code are converted into a third code having a number of code elements equal to the number of code elements in said first-mentioned code.

30. The focussing apparatus of claim 28 wherein the code elements of said second code have a number of code levels which is twice the number of the code levels of said digital code.

* * * * *

UNITED STATES PATENT AND TRADEMARK OFFICE
CERTIFICATE OF CORRECTION

PATENT NO. : 4,914,464
DATED : April 3, 1990
INVENTOR(S) : Miyazawa et al.

It is certified that error appears in the above-identified patent and that said Letters Patent is hereby corrected as shown below: ON TITLE PAGE:

change "Azuma et al." to --Miyazawa et al.-- at section "[75] Inventors", change "Miyazawa Azuma" to --Azuma Miyazawa--

Column 13, line 1, change "storage" to --conversion coefficient storing--

Column 13, line 3, change "storage" to --travel value storing--

Column 13, line 8, change "said storage" to --their respective storing--

Column 14, line 2, after "said" insert --digital code of a--

Column 14, line 2, after "predetermined" insert --number of--

Column 14, line 2, after "code" insert --elements--

Column 14, line 4, after "the" insert --number of--

Column 14, line 10, before "code" insert --digital--

Signed and Sealed this

Twenty-seventh Day of August, 1991

Attest:

HARRY F. MANBECK, JR.

*Attesting Officer*    *Commissioner of Patents and Trademarks*